United States Patent [19]

Swigert et al.

[11] 4,409,598

[45] Oct. 11, 1983

[54] MAGNETIC IMAGING

[75] Inventors: J. Kirk Swigert, Penfield; Darlyn F. Pochan, Ontario, both of N.Y.

[73] Assignee: Xerox Corporation, Stamford, Conn.

[21] Appl. No.: 180,730

[22] Filed: Aug. 25, 1980

[51] Int. Cl.³ ............................................. G01D 15/12
[52] U.S. Cl. .................................................. 346/74.2
[58] Field of Search ............................ 346/74.2–74.7; 358/301; 430/39

[56] References Cited

U.S. PATENT DOCUMENTS

| | | | |
|---|---|---|---|
| 3,522,090 | 7/1970 | Nacci | 117/239 |
| 3,717,459 | 2/1973 | McClure | 346/74.2 X |
| 3,787,877 | 1/1974 | Nacci et al. | 346/74.2 |
| 3,852,525 | 12/1974 | Ichioka et al. | 358/301 |
| 3,973,920 | 8/1976 | Tadokoro et al. | 29/194 |
| 3,987,491 | 10/1976 | Nelson | 346/74.2 |
| 4,068,239 | 1/1978 | Nelson | 346/74.7 |
| 4,110,758 | 8/1978 | Nelson et al. | 346/74.2 |
| 4,216,282 | 8/1980 | Edwards et al. | 430/39 |

FOREIGN PATENT DOCUMENTS 47-1260873  1/1972  Japan .

Primary Examiner—Thomas H. Tarcza

[57] ABSTRACT

Magnetic imaging apparatus and method wherein a latent magnetic image is created on a magnetizable imaging member comprising a base or web containing a magnetizable component and wherein said imaging member has an overcoating of an electroconductive material. After development of the latent image with a magnetic toner composition, the developed image is transferred by pressure contact to a receiving substrate and fixed thereto. The imaging member provides substantially improved adhesive properties and efficient transfer of the toner particles to the receiving substrate.

2 Claims, No Drawings

MAGNETIC IMAGING

This invention relates to magnetic imaging, and more particularly to magnetizable imaging members having an electroconductive coating and their use in magnetographic imaging.

PRIOR ART STATEMENT

There has recently been introduced a magnetic imaging system which employs a latent magnetic image on a magnetizable recording medium which can then be utilized for purposes such as electronic transmission or in a duplicating process by repetitive toning and transfer of the developed image. Such latent magnetic image is provided by any suitable magnetization procedure whereby a magnetizable layer of marking material is magnetized and such magnetism transferred imagewise to the magnetic substrate. Such a process is more fully described in U.S. Pat. No. 3,804,511 to Rait et al.

As is disclosed in that patent, an optical image can be reproduced by first reducing it to a graphical image by employing a magnetizable marking material. Such magnetizable material is typically electroscopic toner comprising a ferromagnetic material which, after image formation, is susceptible to magnetization. There is thus formed an imagewise pattern of magnetization which pattern is then transferred to a magnetic substrate by any one of several methods as disclosed in the patent. Preferably, the magnetization in imagewise pattern is produced in a magnetic substrate by the anhysteretic method whereby the magnetized graphic image is brought into intimate contact with a magnetic substrate and while in contact is subjected to an A.C. signal from a recording head. The magnetic substrate is thereby magnetized in image configuration in accordance with the graphic image. Other methods of utilizing the magnetized graphic image for producing a latent magnetic image are also disclosed such as by providing intimate contact between the graphic magnetic material and a previously uniformly magnetized substrate and applying an erase signal through the graphic image support thereby applying the magnetic image as a shunt for the erase signal. There is thus produced by selective erasure in background areas a latent magnetic image in those areas shunted by the magnetic graphic image. Various other methods of providing such latent image utilizing a previously formed magnetizable graphic image are disclosed in the patent referred to above.

As disclosed in U.S. Pat. No. 3,845,306, it is also known to produce a magnetic image of an original by applying to a uniformly premagnetized surface a thermal image wherein the temperature of certain portions exceeds the Curie point. Such magnetic images can be converted into powder images by utilizing a magnetic toner. It is further known to subject a layer of magnetizable toner to the action of an external magnetic field and to simultaneously expose onto the magnetizable toner a thermal image wherein the temperature of certain portions exceeds the Curie point. This brings about a selective removal or transfer of pulverulent toner so that the residual toner or the removed toner forms a powder image. It has also been proposed to bring a magnetic layer in contact with a control layer wherein certain portions are heated above the Curie point to thus provide on the magnetic layer a permanent magnetic image of the original.

After formation, the latent magnetic image may be developed, that is, made visible by contact with magnetic marking material such as a magnetic toner composition. Subsequent to development of the latent magnetic image, it is usually desirable to transfer the toner image from the magnetic imaging member to a permanent substrate such as paper.

For this operation, there are basically two methods used in magnetographic printing. One method is by electrostatic means such as employing a corona device, and the other is pressure transfer. It has been found that pressure transferred images usually exhibit higher resolution than corona transferred images and offer a fusing advantage when fixed by flash or heat/pressure methods. In addition, higher transfer efficiency has been observed with the use of pressure. High transfer efficiencies are especially desirable when a wide variety of transfer substrates such as calendered papers, clay papers, and assorted plastics are used in the imaging process. However, most magnetic toner materials exhibit incomplete release or transfer from a magnetic imaging member, especially when using low transfer pressures.

U.S. Pat. Nos. 3,987,491 and 4,068,239 relate to magnetic image transfer and imaging apparatus. Briefly, these patents are directed to magnetic toner imaging in which a magnetic image is formed on a chromium oxide and resin binder sheet. The magnetic image is then transferred to a drum having a layer of nickel cobalt, developed with toner, and then pressure-transferred therefrom to a receiving sheet. U.S. Pat. No. 3,852,525 is similar using a metallic permalloy surface as the printing member.

The object of this invention is to provide an improved magnetizable imaging member and imaging method.

A further object of this invention is to provide a more efficient method of pressure transferring toner particles from a magnetic imaging member to a receiving sheet.

Another object of this invention is to provide a magnetic imaging member having an electroconductive coating which will enable efficient pressure transfer of toner images at lower transfer pressure without loss of image quality.

These and other objects of this invention will be apparent from a reading of the following description of the invention.

In accordance with the present invention, there is provided an improved imaging member and imaging method wherein superior duplicated images are produced. The improved imaging member is obtained by providing an imaging member comprising a base or web containing a magnetizable material, such as a magnetic tape having a magnetic recording surface, which has been overcoated with an electroconductive material. More specifically, the preferred imaging member comprises a magnetic tape having a chromium dioxide recording surface sold under the tradename Crolyn ® by E. I. duPont Company, Wilmington, Delaware. To such a magnetic tape is applied an overcoating of an electroconductive material such as aluminum, copper, nickel, cobalt, magnesium, tin, zinc, chromium, gold, silver and mixtures or alloys thereof. In addition, the electroconductive overcoating may be selected from carbon layers, carbon filled polymer films, and electroconductive polymer films. However, the best results have been obtained with aluminized overcoatings as the release characteristics of the imaging member with respect to the toner image are most efficient. It has been found that such overcoated magnetic tapes generally allow the use of lower transfer pressures when employed in the pressure transfer of toner images to various paper stocks.

The improved magnetic imaging method comprises the steps of creating a latent magnetic image on the aforementioned improved imaging member, developing the latent magnetic image by contacting it with a toner material containing a magnetizable component, transferring the developed magnetic image by pressure contact to a receiving substrate, and fixing the transferred image to the receiving substrate. It has been found that the improved imaging member provides improved abhesive properties with respect to toner particles when they are pressure transferred to the receiving substrate resulting in surprisingly substantially improved efficient transfer of the toner image to the receiving substrate.

In operation, a film transparency bearing an image is exposed by means well known in the art onto a magnetized imaging member having an overcoating of an electroconductive material to provide a latent magnetic image. The resulting latent image is then developed by contact with a toner composition having both an electrostatically attractable component and a magnetically attractable component. The magnetically attractable component may be present in the toner in the amount of about 20% by weight to about 90% by weight. The developed image is then contacted with a receiving member to which pressure is applied and the image is thereby transferred thereto. After transfer of the image to the receiving member, the image is fixed thereto. Any fixing method can be employed. Typical suitable fixing methods include heating the toner in the developed image to cause the resins thereof to at least partially melt and become adhered to the receiving member, the application of pressure to the toner optionally accomplished with heating such as the use of a heated roller, solvent or solvent vapor to at least partially dissolve the resin component of the toner, or any combination of the above. The receiving member is typically sufficiently hard to allow fixing solely by the application of pressure such as, for example, by a contact roller in an amount sufficient to calender the toner. These techniques are conventional in the art of fixing of toner and need not be elaborated upon herein.

In a magnetographic printing assembly once a magnetic latent image has been created on the improved imaging member of this invention, the imaging member is transported to a developing station wherein electroscopic toner containing both electrostatically attractive and magnetically attractive components is applied to the latent image. The imaging member in passing through the developing station is provided with a uniform layer of toner upon its surface. After having developed the latent magnetic image, the imaging member carrying the developed image is brought into contact with image transfer means. Typically, the image transfer means comprises at least a pair of transfer rollers or a transfer roller and an idler roller. Typically, the developed imaging member is sandwiched between a receiving member and the transfer means. Other methods of transferring the toned magnetic image onto a copy sheet may be used that are either known or obvious to one skilled in the art. After transfer of the toned magnetic image to the receiving sheet, the receiving sheet is brought into contact with fixing means. Fixing means may comprise a pair of driven heated rollers which apply a fixing pressure to the developed image, said pressure being preferably of magnitude sufficient to calender the toner image. Fixing means can comprise any means for carrying out the aforementioned fixing step such as, for example, solvent vapor spray means, solvent dip means, and various conventional heating means such as infrared radiation sources, heated shoes or heated rollers.

The magnetizable toner composition utilized at the development station preferably comprises a resinous material that can be fused to a receiving medium when brought into contact therewith under heat and pressure such as by a heated roller. It will be understood that fixing need not occur at a transfer station but can optionally be provided downstream. In that case, a separate fusing station having conventional fusing means can be employed. While the receiving medium may be fed from a supply roll, it will be appreciated that the receiving medium can be provided in any form, e.g., sheet, strip, web, etc.

Subsequent to transfer of the toner from the latent magnetic image to the receiving medium, the imaging member may be passed adjacent to an erase means suitably energized by a power source prior to re-magnetization by means well known in the art. Further, the imaging member may be provided in the form of an endless web or tape traveling over rollers.

Any suitable development technique can be employed for the development of the magnetic latent image residing on the imaging member. Typical suitable development methods include cascade development, powder cloud development, and liquid development. It will be appreciated, of course, that if electrostatic transfer techniques are employed, the toner utilized at the development station comprises an electrostatically attractable component.

Any suitable magnetizable toner composition may be employed in the imaging method of this invention. Typical magnetizable toner compositions include an electrostatically attractable component such as gum copal, gum sandarac, cumarone-indene resin, asphaltum, gilsonite, phenolformaldehyde resins, resin-modified phenolformaldehyde resins, methacrylic resins, polystyrene resins, epoxy resins, polyester resins, polyethylene resins, vinyl chloride resins, and copolymers or mixtures thereof. The particular toner material to be employed depends upon its triboelectric properties. However, it is preferred that the toner material be selected from polyhexamethylene sebacate and polyamide resins. Among the patents describing toner compositions are U.S. Pat. No. 2,659,670 issued to Copley; U.S. Pat. No. 2,753,308 issued to Landrigan; U.S. Pat. No. 3,070,342 issued to Insalaco; U.S. Pat. No. Re. 25,136 to Carlson, and U.S. Pat. No. 2,782,288 issued to Rheinfrank et al. These toners generally have an average particle diameter in the range substantially 5 to 30 microns.

Any suitable pigment or dye may be employed as the colorant for the toner particles. Colorants for toners are well known and are, for example, carbon black, nigrosine dye, aniline blue, Calco Oil Blue, chrome yellow, ultramarine blue, Quinoline Yellow, methylene blue chloride, Monastral Blue, Malachite Green Oxalate, lampblack, Rose Bengal, Monastral Red, Sudan Black BN, and mixtures thereof. The pigment or dye should be present in the toner in a sufficient quantity to render it highly colored so that it will form a clearly visible image on a recording member.

Any suitable magnetic or magnetizable substance may be employed as the magnetically attractable component for the toner particles. Typical magnetically attractable materials include metals such as iron, nickel, cobalt, ferrites containing nickel, zinc, cadmium, barium, and manganese; metal oxides such as $Cr_2O_3$, $Fe_2O_3$ and $Fe_3O_4$ or magnetite and hematite; metal alloys such as nickel-iron, nickel-cobalt-iron, aluminum-nickel-cobalt, copper-nickel-cobalt, and cobalt-platinum-manganese. Preferred for the instant process are magnetite and iron particles as they are black in color, low cost and provide excellent magnetic properties. The magnetic component particles may be of any shape and any size which results in magnetic toner particles having excellent transfer properties. Generally, the magnetic component particles may range in size from about 0.02 micron to about 1 micron. A preferred average particle size for the magnetic component particles is from about 0.1 to about 0.5 micron average diameter. The magnetic component particles may be any shape, including acicular or cubical. In use, the transfer efficiency of the toner particles is greater than about 70 percent and generally is on the order of at least about 98 percent.

The following examples further define and describe the magnetic imaging member and toner compositions of the present invention and methods of utilizing them to develop latent magnetic images. Parts and percentages are by weight unless otherwise indicated.

EXAMPLE I

A toner composition was prepared as follows. To about 38 pounds of a solvent mixture comprising about 4 parts of chloroform and about 6 parts of hexane was added about 0.7 pounds of polyhexamethylene sebacate, a linear polyester, and about 1.3 pounds of an uncoated magnetic pigment available under the tradename Pfizer magnetite MO4232 from Pfizer, Inc., of Easton, Pa. The polyester was prepared by bulk polymerizing a mixture comprising about 38 parts of 1,6-hexanediol and about 62 parts of sebacic acid in the presence of about 0.1 part/hundred of lead acetate. The mixture was heated and the temperature maintained at about 425° F. until the reaction was substantially complete. The polyester product had an intrinsic viscosity of about 0.8 deciliter per gram by measurements in toluene at about 25° C.

The dispersion was milled for about 30 minutes at ambient temperature and then transferred to a gravity feed kettle. The mixture was fed onto a 2 inch diameter spinning disc atomizer at a rotation speed of about 50,000 r.p.m. using a commercial spray dryer. The feed rate was about 200 ml. per minute. The inlet drying temperature was held at about 180° F. The spray-dried particles were passed through a cyclone separator and collected in a bell jar. After drying overnight in a vacuum oven, the particles were screened through an 84 $\mu$m screen to remove agglomerates. The spray-dried toner particles were found to have a volume median diameter of about 12 microns and a geometric standard deviation of about 1.43. The number median diameter of the toner particles was about 5.7 microns with a geometric standard deviation of about 1.74.

The toner composition comprised about 65 parts of magnetite and about 35 parts of polyhexamethylene sebacate. The toner material was dry-blended with about 0.4 parts by weight of a flow agent additive commercially available under the tradename Silanox ® 101 from Cabot Corporation, Boston, Mass., to provide a free-flowing, magnetic developer material. Silanox ® 101 is a hydrophobic fumed silicon dioxide. A segment of magnetizable tape commercially available under the tradename Crolyn ® from the DuPont Company was magnetized in image configuration and hand-developed with the magnetic developer material.

The pressure transfer characteristics of the magnetic developer material were evaluated as follows. The aforementioned hand-developed magnetic tape was "sandwiched" between 2 sheets of Xerox 1024 paper and passed between two 3" diameter steel rolls using about 65 pounds per linear inch (pli) pressure at a speed of about 5 inches/second. The magnetic developer material was transferred to the receiving sheet. The same magnetic tape segment was hand-developed without precleaning and again passed between the steel rolls at the aforementioned pressure and speed. The magnetic developer material was transferred to a second receiving sheet. This procedure was repeated until 10 prints were produced. Each print was oven-fused and evaluated for print density. The tape segment was examined for toner residue and toner film build-up. No change in the reflectance density of 1.4 was measured on either the first or tenth prints. No toner residue or film was visually observed on the tape indicating excellent toner transfer. No tape damage was observed.

EXAMPLE II

The procedure of Example I was followed except that the developed magnetic tape was "sandwiched" between 2 sheets of 70 pound clay coated offset stock paper commercially available as Vintage Gloss ® from the Genesee Valley Paper Co., Inc. of Rochester, New York. The pressure transfer characteristics of the magnetic developer of Example I were evaluated as in Example I. It was found that there was no change in reflectance density of 1.4 on either the first or tenth prints. No toner residue or film was visually observed on the tape. No tape damage was observed. It was found that excellent toner transfer, i.e., essentially 100%, resulted.

EXAMPLE III

The procedure of Example I was followed except that the magnetizable tape of Example I, commercially available under the tradename Crolyn ® from the DuPont Company, was modified as follows: The magnetic surface of the tape was aluminized using a vacuum metallizing process. The resultant aluminum layer was approximately 0.04 micron thick and exhibited a surface resistivity of approximately 2 ohms per square. The pressure transfer characteristics of the magnetic developer of Example I were evaluated as in Example I except that 25 pli pressure was used for the transfer. It was found that there was no change in the reflectance density of 1.4 on either the first or tenth prints. No toner residue or film was visually observed on the aluminized tape indicating excellent toner transfer. No tape damage was observed.

EXAMPLE IV

The procedure of Example III was followed except that the developed aluminized magnetic tape was "sandwiched" between 2 sheets of 70 pound clay coated offset stock paper commercially available as Vintage Gloss ® from the Genesse Valley Paper Co., Inc. of Rochester, New York. No tape damage was observed and excellent toner transfer, i.e., essentially 100% toner transfer, resulted.

EXAMPLE V

A toner composition was prepared as follow. To about 87.5 pounds of chloroform was added about 9.375 pounds of an uncoated magnetic pigment available under the tradename Pfizer magnetite MO4232 from Pfizer, Inc., of Easton, Pa. and about 3.125 pounds of a polyamide resin commercially available under the tradename Emerez 1552 from Emery Industries, Inc. of Cincinnati, Ohio. Emerez 1552 is a solid polyamide material derived from the reaction of a dimer acid with a linear diamine.

The dispersion was milled for about 30 minutes at ambient temperature and then transferred to a gravity feed kettle. The mixture was fed onto a spinning disc atomizer at a rotation speed of about 50,000 r.p.m. using a commercial spray dryer. The feed rate was about 200 ml. per minute. The inlet drying temperature was held at about 180° F. The spray-dried particles were passed through a cyclone separator and collected in a bell jar. After drying overnight in a vacuum oven, the particles were screened through an 84 $\mu$m screen to remove agglomerates. The spray-dried toner particles were found to have a volume median diameter of about 13.3 microns and a geometric standard deviation of about 1.59. The number median diameter of the toner particles was about 5.2 microns with a geometric standard deviation of about 1.80.

The toner composition comprised about 75 parts by weight of magnetite and about 25 parts by weight of the polyamide. The toner material was dry-blended with about 0.4 parts by weight of a flow agent additive commercially available under the tradename Silanox® 101 from Cabot Corporation, Boston, Mass., to provide a free-flowing, magnetic developer material. Silanox® 101 is a hydrophobic fumed silicon dioxide. A segment of magnetizable tape commercially available under the tradename Crolyn® from the DuPont Company was magnetized in image configuration and hand-developed with the magnetic developer material.

The pressure transfer characteristics of the magnetic developer material were evaluated as follows. The aforementioned hand-developed magnetic tape was "sandwiched" between 2 sheets of 20 pound bond (Xerox 1024) paper and passed between two 3" diameter steel rolls using about 65 pli pressure at a speed of about 5 inches/second. The magnetic developer material was transferred to the receiving sheet. The same magnetic tape segment was hand-developed without precleaning and again passed between the steel rolls at the aforementioned pressure and speed. The magnetic developer material was transferred to a second receiving sheet. This procedure was repeated until 10 prints were produced. Each print was oven-fused and evaluated for print density. The tape segment was examined for toner residue and toner film build-up. No change in the reflectance density of 1.4 was measured on either the first or tenth prints. No toner residue or film was observed on the tape. No tape damage was observed. It was found that excellent toner transfer, i.e., essentially 100%, resulted.

EXAMPLE VI

The procedure of Example V was followed except that the aluminized magnetic tape of Example III was employed. The pressure transfer characteristics of the magnetic developer of Example V were evaluated as in Example V except that 25 pli pressure was used for the transfer. It was found that there was no change in the reflectance density of 1.4 on either the first or tenth prints. No toner residue or film was observed on the tape. No tape damage was observed. It was found that excellent toner transfer, i.e., essentially 100%, resulted.

EXAMPLE VII

The procedure of Example VI was followed except that the developed magnetic tape was "sandwiched" between 2 sheets of 70 pound clay coated offset stock paper commercially available as Vintage Gloss® from the Genesee Valley Paper Co., Inc. of Rochester, New York. It was found that excellent toner transfer, i.e., essentially 100%, resulted. No tape damage was observed.

In summary, it has been shown from the above Examples that the imaging members of this invention provide for efficient pressure transfer of developed images from a magnetizable imaging surface to a receiving substrate at a low transfer pressure without damaging the imaging surface. Further advantages of this invention include elimination of the need for a corotron in the transfer system; no solvent or contact cleaning of the imaging surface is required after toner transfer; higher image resolution is obtained; and less machine power is necessary.

Although specific materials and conditions are set forth in the foregoing examples, these are merely intended as illustrations of the present invention. Various other suitable resins, electroconductive materials, magnetic substances, additives, pigments, colorants, and/or other components may be substituted for those in the examples with similar results. Other materials may also be added to the toner to sensitize, synergize or otherwise improve the fusing properties or other properties of the system.

Other modifications of the present invention will occur to those skilled in the art upon a reading of the present disclosure. These are intended to be included within the scope of this invention.

We claim:
1. An improved magnetic imaging method comprising the steps of:
   (a) creating a latent magnetic image on a flexible and movable magnetizable imaging member, wherein said magnetizable imaging member comprises a base or web having a solid coating of magnetizable material thereon and the magnetizable material having an overcoating of electroconductive material that is selected from the group consisting of aluminum, copper, nickel, cobolt, magnesium, tin, zinc, chromium, gold, silver, and mixtures or alloys thereof, said overcoating of electroconductive material being approximately 0.04 microns thick and having a surface resistivity of approximately 2 ohms per square;
   (b) developing said latent magnetic image with toner having magnetic or magnetizable properties as said magnetizable imaging member is moved past a developing station, wherein the developed image lies on the surface of the electroconductive material;
   (c) pressure transferring the developed image from the surface of the electroconductive material of the magnetizable imaging member to a receiving substrate by passing the magnetizable image member and the receiving substrate with the developed image therebetween through at least two rotatable pressure rolls which exert a linear pressure thereon of approximately 25 pounds per linear inch, whereby adhesive properties of the electroconductive material enable efficient release and transfer of greater than 90% of the developed image to the receiving substrate without damaging the imaging member and without toner residue buildup; and (d) fixing said developed image to said receiving substrate.

2. A magnetic imaging method in accordance with claim 1, wherein the magnetizable material of the magnetizable imaging member comprises chromium dioxide; wherein said electroconductive material is aluminum; and wherein the receiving substrate is paper.

* * * * *